(12) United States Patent
Rollier et al.

(10) Patent No.: US 6,463,669 B1
(45) Date of Patent: Oct. 15, 2002

(54) APPARATUS FOR CHECKING THE SHAPE OF A PART

(75) Inventors: Michel Rollier, Neuchâtel (CH); Pierre Tschampion, La Neuveville (CH)

(73) Assignee: Rollomatic S.A. (CH)

( * ) Notice: Subject to any disclaimer, the term of this patent is extended or adjusted under 35 U.S.C. 154(b) by 0 days.

(21) Appl. No.: 09/673,486

(22) PCT Filed: Mar. 13, 1999

(86) PCT No.: PCT/IB99/00770

§ 371 (c)(1),
(2), (4) Date: Oct. 13, 2000

(87) PCT Pub. No.: WO99/53265

PCT Pub. Date: Oct. 21, 1999

(30) Foreign Application Priority Data

Apr. 15, 1998 (CH) ................................. 863/98
May 6, 1998 (CH) ................................. 1018/98

(51) Int. Cl.[7] ............................................. G01B 5/20
(52) U.S. Cl. ........................... 33/549; 33/550; 33/553
(58) Field of Search .......................... 33/549, 550, 551, 33/553, 554, 555, 555.1, 555.3

(56) References Cited

U.S. PATENT DOCUMENTS

| 2,977,533 | A | * | 3/1961 | Savage | 33/551 |
|---|---|---|---|---|---|
| 4,064,633 | A | * | 12/1977 | Wertepny | 33/550 |
| 4,679,330 | A | | 7/1987 | Williams | 33/550 |
| 4,914,827 | A | * | 4/1990 | Cook | 33/549 |
| 5,024,002 | A | * | 6/1991 | Possati | 33/549 |
| 5,044,088 | A | * | 9/1991 | Peucker | 33/550 |
| 5,086,569 | A | * | 2/1992 | Possati et al. | 33/549 |
| 5,301,436 | A | * | 4/1994 | Johnston | 33/551 |
| 5,542,188 | A | * | 8/1996 | Ertl et al. | 33/549 |
| 5,685,085 | A | * | 11/1997 | Bond | 33/555.3 |

FOREIGN PATENT DOCUMENTS

EP 0 626 559 A1 11/1994

* cited by examiner

Primary Examiner—Christopher W. Fulton
(74) Attorney, Agent, or Firm—McGlew and Tuttle, P.C.

(57) ABSTRACT

An apparatus is provided for checking the shape of a part having a portion which is a cylinder of revolution around an axis and a reference end face. The apparatus includes a base and a support arrangement mounted on the base for receiving the cylinder portion and comprising two V-shaped pieces. A positioning arrangement is provided for positioning the part axially with respect to the reference end face. A mechanism is provided for driving the part in rotation about the axis. The positioning arrangement comprises a rectilinear portion with an hemispheric end providing an abutment for the end face. The rectilinear portion is mounted slidingly on the base along a direction which forms, with respect to the axis, an angle corresponding to the half of the angle of the V-shaped pieces. An adjustment means is provided for adjusting the position of the rectilinear portion in a manner which maintains the abutment point of the hemispheric end with the end face on the axis.

8 Claims, 8 Drawing Sheets

APPARATUS FOR CHECKING THE SHAPE OF A PART

FIELD OF THE INVENTION

The invention relates generally to an apparatus for checking the shape of a part and more particularly relates to an apparatus for checking the shape of a part with a portion that is a cylinder of revolution about an axis, the part bearing on the apparatus at a plurality of points forming a support polygon.

BACKGROUND OF THE INVENTION

Patent application EP 0 626 559 describes an apparatus with displacable roller supports in accordance with the diameter of the part to be checked.

It is known, for example from U.S. Pat. No. 4,679,330 cited in EP 0 626 559 to employ a sensor or a comparator to inspect the shape concentricity of a part exhibiting a portion formed as a cylinder of revolution. However in order that the measurements effected by such comparator be reliable when the part is rotated around the axis of such cylinder, it is necessary that the support arrangement and the mechanism for driving the part in rotation do not generate undesirable displacements in translation.

It is known to employ one or several abutments which are retractable according to the rotation axis, such abutments being housed in the apparatus. The part is held against the abutment by means such as a slight inclination of the apparatus causing the part to rest against the abutment by simple gravity or again through the use of magnetized abutments if the material of the part is suitable.

The known systems of positioning by abutment all suffer the same defect: they do not permit fine adjustment of the height of the end of the abutment which comes into contact with an end face of the part.

Such end face may exhibit defects of flatness; for example if it terminates the cylindrical portion of the part, such face has perhaps been cut off by a milling cutter turning around an axis which does not intersect with the axis of the part. There results therefrom periodic displacements of the part at each rotation of such part on its support arrangement, this being detrimental to the reliability of the shape measurements of the part, especially in its noncylindrical portion.

SUMMARY OF THE INVENTION

According to the invention an apparatus is provided for checking the shape of a part having a portion which is a cylinder of revolution around an axis and a reference end face.

The apparatus includes a base and a support arrangement mounted on the base for receiving the cylinder portion and comprising two V-shaped pieces. A positioning arrangement is provided for positioning the part axially with respect to the reference end face. A mechanism is provided for driving the part in rotation about the axis. The positioning arrangement comprises a rectilinear portion with an hemispheric end providing an abutment for the end face. The rectilinear portion is mounted slidingly on the base along a direction which forms, with respect to the axis, an angle corresponding to the half of the angle of the V-shaped pieces. An adjustment means is provided for adjusting the position of the rectilinear portion in a manner which maintains the abutment point of the hemispheric end with the end face on the axis.

It is known from physics that a solid is in equilibrium only if its center of gravity is located above a support polygon. In the cited documents in which the part rests on cylindrical rollers it is respectively a generatrix of each roller which determines a support rectangle. The plurality of the points of contact by which the part rests on the apparatus forms these two generatrices.

In a specific embodiment of the invention which will be described hereinafter four points of contact are satisfactory.

The positioning arrangement according to the invention permits placing the part in abutment against a point contained in its axis of rotation. In contrast to the prior art this point is adjustable in height which enables adjusting it as a function of the diameter of the cylindrical portion of the part. When the latter is driven by the drive mechanism, the point formed by the abutment is constantly in contact with the same point on the end face of the part. In the prior art the geometric location of the points of contact between the abutment and the end face is constituted by the intersection between such face and a cylinder the radius of which is the distance from the abutment to the axis of the part. In the very frequent cases where the face exhibits a defect in flatness, such intersection is not contained in a plane orthogonal to the axis.

The invention also resolves the problem when the end face is planar but not perpendicular to the axis. In the prior art the location of the contact points between the abutment and the end face is then an ellipse contained in the plane of the end face, centered on the intersection of the axis of the part with the end face.

Whatever be the form of the end face, supposedly not too remote from a plane perpendicular to the axis, the fact of aligning the abutment of the positioning arrangement with the axis of rotation of the part in accordance with the invention suppresses the periodic translation movements of the part.

This enables precise and reliable measurements by known measuring instruments which check the shape of the part, particularly the portions outside the support arrangement such as reliefs.

In a specific embodiment of the invention, maintaining the part against the abutment colinear with the axis is effected by the rotational drive mechanism. In the case where the support arrangement is not a motor, such mechanism may consist of a roller or disc exerting pressure and drive simultaneously, coming from above the cylindrical portion of the part and rotating on an axis exhibiting a slight angle with the axis of the part, in a manner such that the driving has as corollary the maintenance in abutment of the end face.

This type of mechanism has the advantage of being disengageable and authorizing very low rotation speeds.

A problem frequently met with when rotation speeds are very low is the presence of lubricants on the part to be checked. Such lubricants which cause skating of the drive roller or disc must be eliminated: in the prior art by a cleansing prior to the checking.

It has been found that the use of silicone for the periphery of the drive disc coming into contact with the part enables dispensing with such cleansing without incurring drawbacks.

The basic molecular structure of such a silicone is formed by a polymerized chain comprising alternately atoms of oxygen and silicon, two radicals R and R' being likewise connected to each silicon atom.

In a specific embodiment the silicone is obtained by mixing a resin with a hardener.

Satisfactory results are obtained when the pot life of the material before polymerization is at least 90 minutes.

In a specific embodiment of the invention the height of the position of the abutment is calculated directly from the diameter of the cylindrical portion of the part. In the case where the support arrangement of the part consists of four points of contact located on two vees (V-shaped pieces) arranged on either side of the center of gravity of the part, each vee being of 90°, symmetric relative to the vertical line passing through its summit, the height of the axis is determined by the diameter of the cylindrical portion of the part. In each of the planes of the two vees the radii joining the axis to the respective points of contact are perpendicular to the branches of the vee. The angle of each vee being itself also of 90°, the parallelogram in the plane of one of the two vees joining the points of contact to the summit of the vee and to the intersection of the axis with such plane is a square. The height of the abutment measured by reference to the line joining the summits of the two veer, must thus be equal to the product of the radius of the cylinder by the square root of 2, or again, to the quotient of the diameter of the cylindrical portion of the part divided by this same number. The abutment is then exactly in the extension of the axis of part resting on the two vees.

In a specific embodiment of the invention, calculations involving the square root of 2 are dispensed with by giving the abutment an appropriate configuration.

In such configuration the abutment is formed from a rectilinear portion the profile of which is at choice but adapted to sliding in a sleeve having a complementary profile. Such sleeve is inclined at 45° in a vertical plane containing the line of the summits of the vee and the axis.

The rectilinear portion of the abutment is terminated by a hemispheric end, arranged in a manner such that a single point of the hemisphere contacts the end face of the part. This point is also on the axis of the cylindrical portion of the part.

The abutment and its sleeve are fixed to calibration means enabling the positioning of the abutment by simple manipulations, as will be described in the detailed description.

In a second embodiment of the invention, the rectilinear portion of the abutment is fixed to a micrometer screw inclined at 45°. The advantage of this embodiment is that it suffices to rotate the knurled head of such micrometer screw until the diameter of the cylindrical portion of the part is displayed. One is then liberated from the necessity of manipulating the part in order to position the abutment.

DESCRIPTION OF THE PREFERRED EMBODIMENT

Figure 4:
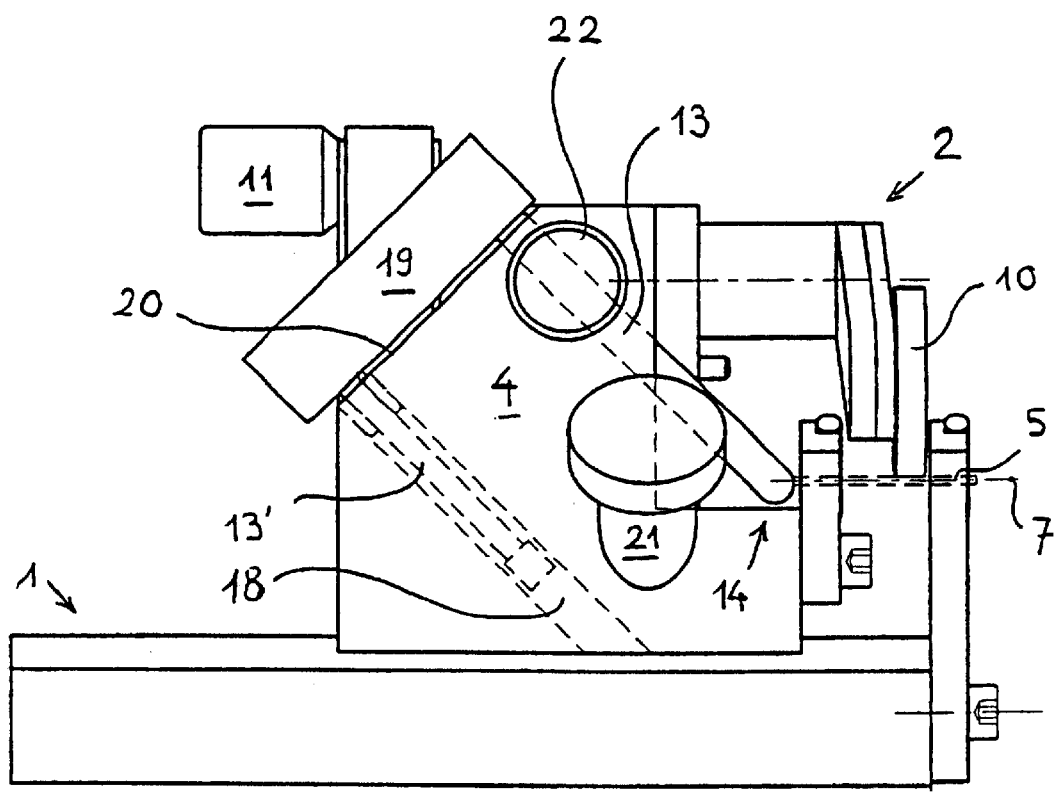
FIG. 4 is a front view of the apparatus of FIG. 3.
Figure 5:
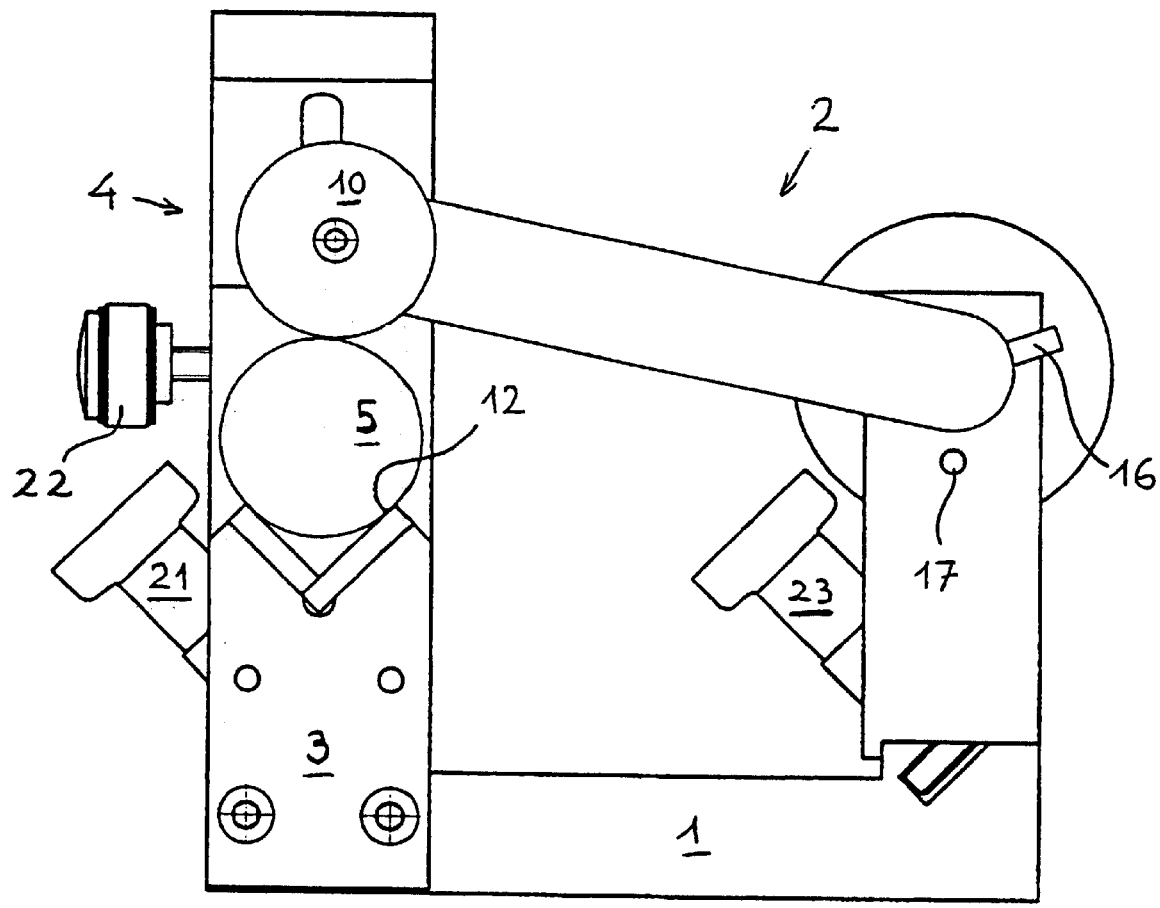
FIG. 5 is a right elevation of the same apparatus, mechanism engaged on a large diameter part.

Referring to the drawings in particular, the apparatus comprises a mounting base 1 onto which is secured a driving mechanism 2, a support arrangement 3 and a positioning arrangement 4 for the part 5. The part 5 is shown in dotted outline on FIG. 4, on FIG. 6 and on FIG. 8 for greater clarity. In FIGS. 5 and 7 it is shown in full outline. Such part 5 (FIG. 6) exhibits an end face 6 apt to show defects in flatness. In the case in which face 6 is planar, its plane can be non-orthogonal to the axis 7 of a cylindrical portion of part 5.

A comparator, not shown, is also arranged on the mounting base 1; its sensor checks in a known manner the shape of part 5 which may include reliefs for example in an exterior portion having a shape not perfectly cylindrical.

Figure 6:
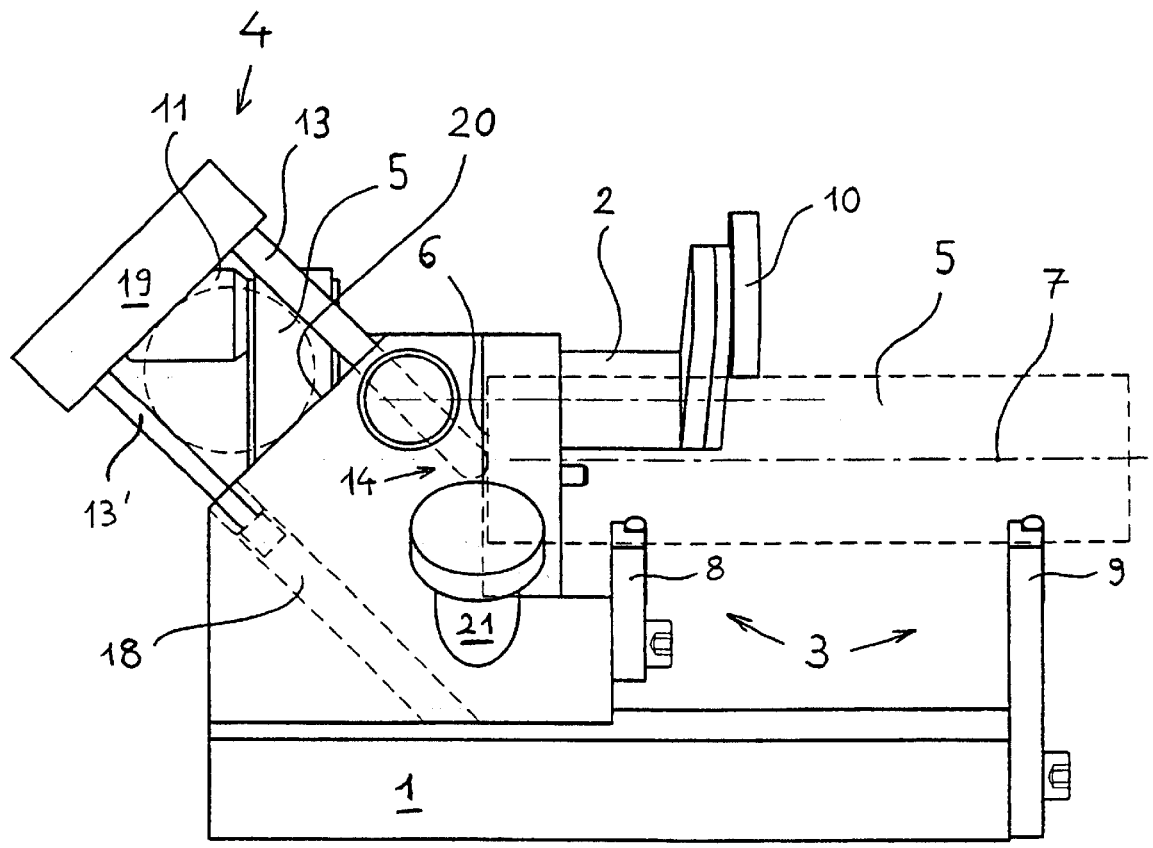
FIG. 6 is a front view of the apparatus of FIG. 5.
Figure 7:
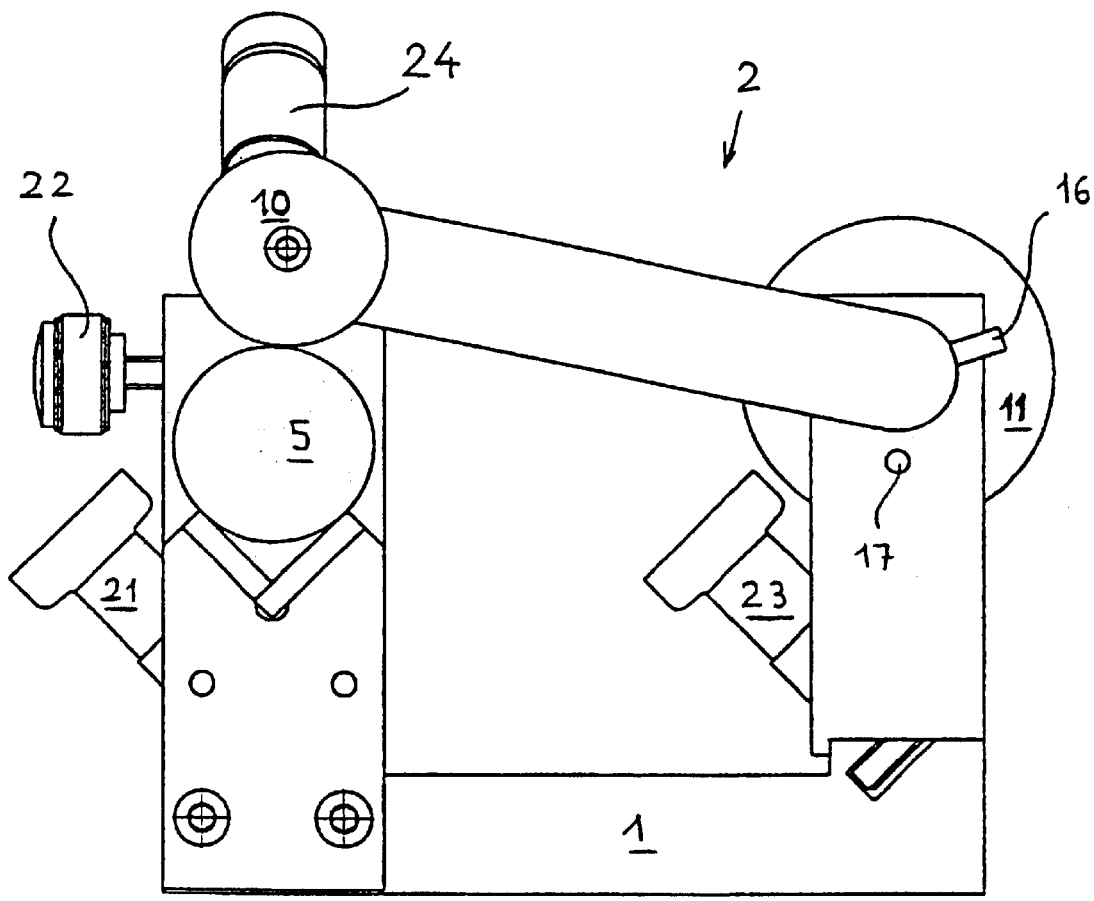
FIG. 7 is a right elevation of an apparatus in accordance with the second embodiment (comprising a micrometer screw), mechanism engaged on a large diameter part.

Continuing with FIG. 6, it is seen that the support arrangement 3 is formed from two vees 8 and 9. Vee 8 is sideways adjustable with the assembly of arrangement 4, and maintained by a blocking screw 21 relative to the mounting base 1. This enables the adaptation to parts 5 which can be more or less long.

The driving meachanism 2 comprises a disc 10, driven by a belt, the movement being generated by a motor 11. The disc 10 sets part 5 into rotation on the vees 8 and 9. The contact points such as 12 (FIG. 5) exert only reduced friction: such drive is very reliable even at low speed.

The rectiliner portion 13 (FIG. 4) slides in a sleeve inclined at 45°. At its lower portion a hemispheric end 14 provides an abutment to part 5. Such abutment is in the axis 7 of part 5 (FIGS. 6, 7, and 8) which corrects all defects of the end face 6 of the part 5 from the aspect of possible periodic movements which could be provoked at the instant of its being driven by disc 10.

Figure 2:
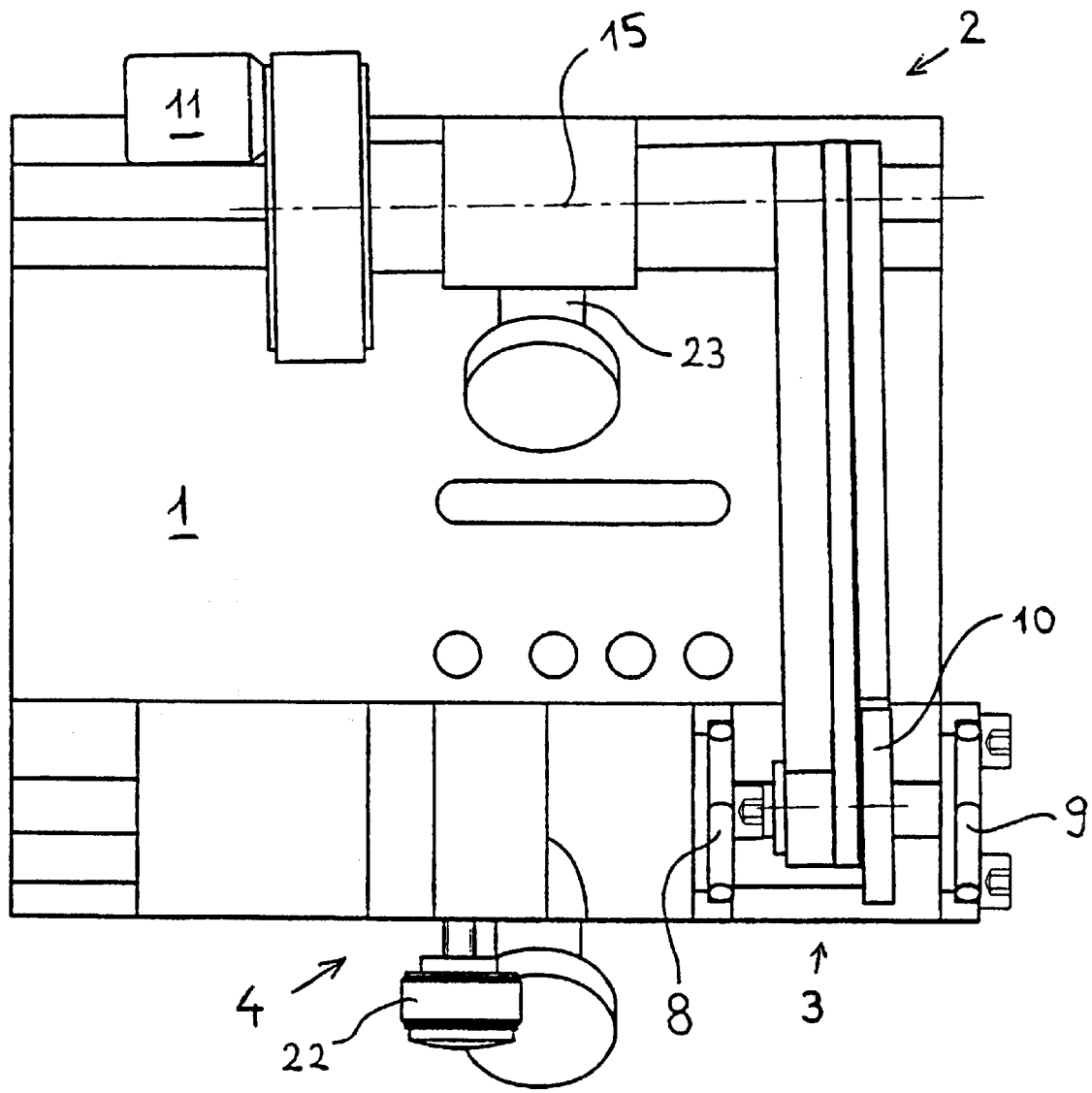
FIG. 2 is a top view of the same apparatus, mechanism engaged, without the part to be checked.
Figure 3:
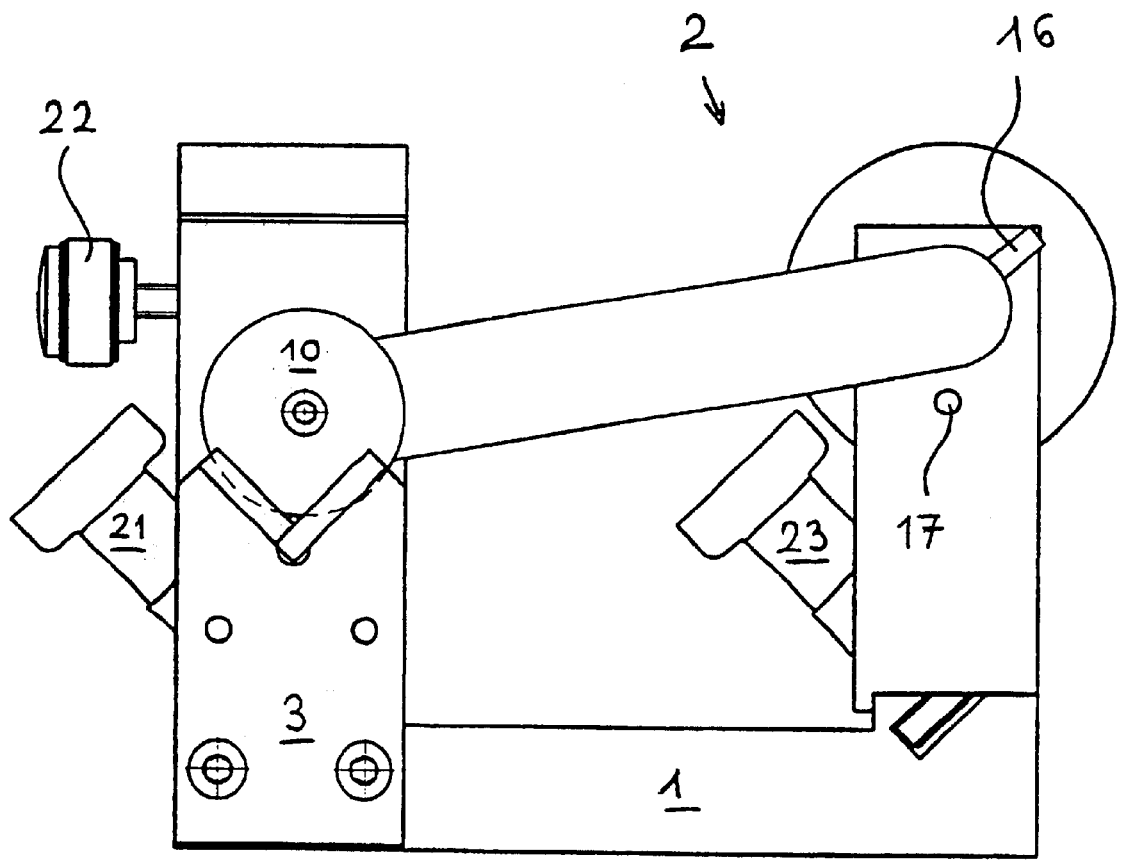
FIG. 3 is a right elevation of the same apparatus mechanism engaged on a small diameter part.

FIG. 2 shows that the primary horizontal axis 15 of the drive mechanism 2, as well as the rotation axis of disc 10, which is parallel to axis 15, both exhibit a very slight angle relative to the line joining the summits of the vees 8, 9 and, when a part 5 is arranged on such vees 8, 9, also to its axis 7.

As a result thereof, the frictional force between the disc and the part 5 includes a small horizontal component parallel to axis 7 which retains part 5 against abutment 14.

Figure 1:
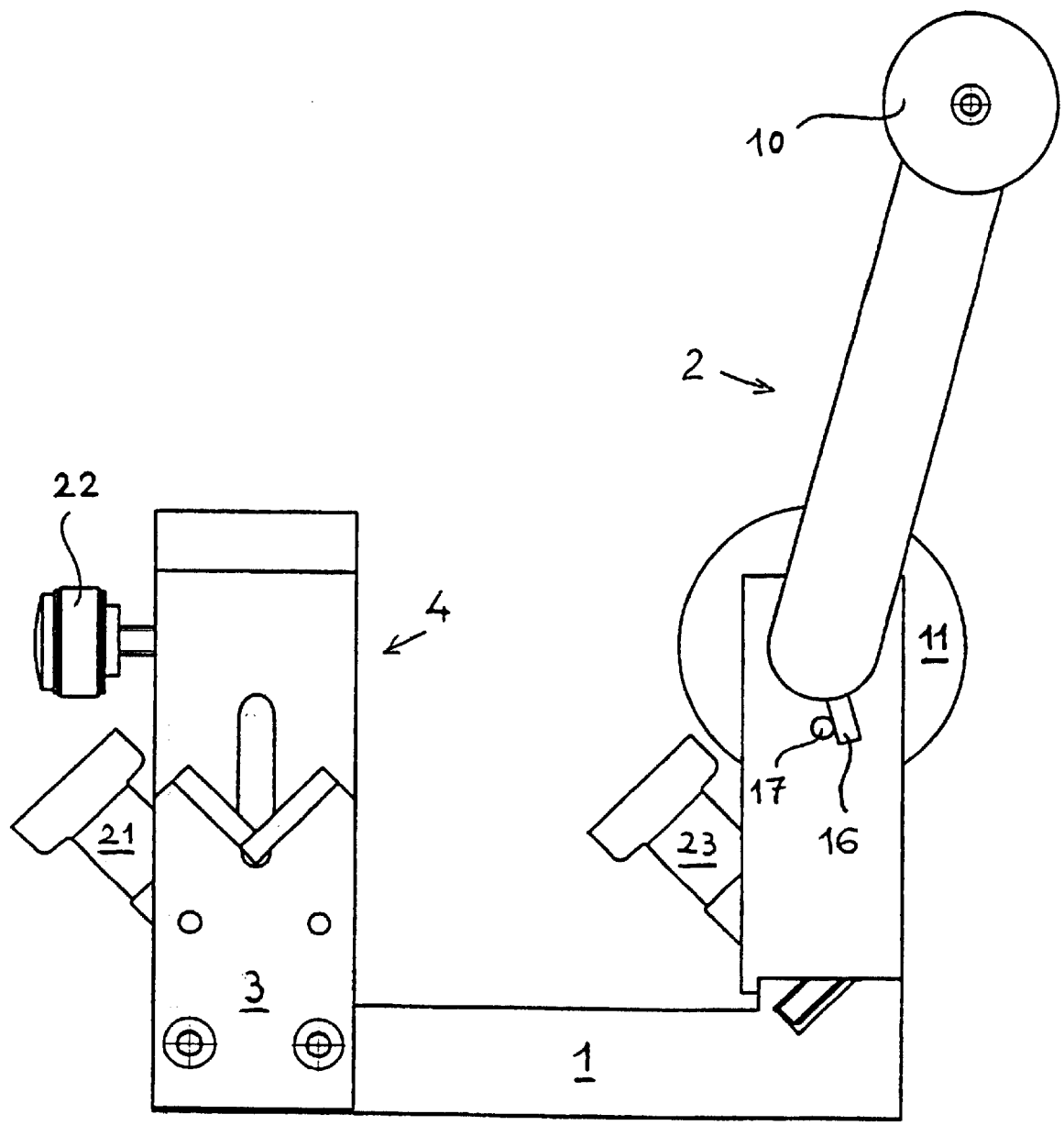
FIG. 1 is a right elevation view of an apparatus in 30 accordance with a first embodiment with the mechanism disengaged and without the part to be checked.

The mechanism 2 comprises a lug 16 which bears on a stop 17 when in the disengaged position (FIG. 1).

FIG. 6 shows the operation of the calibration means 13', 20 18, 19, 20, complementary to the abutment 14 and the rectilinear portion 13.

The rectilinear portion 13 of the positioning arrangement 4 is fixed to a plate 19, guided in displacement by a leg 13', itself sliding in a bore 18. The adjustment of leg 13' in bore 18 and of the rectilinear portion 13 in its sleeve is such that plate 19 is perfectly guided in displacement in a direction at 45° to the vertical.

Surface 20 is exactly parallel to the lower face of plate 19 which is opposite to it; for the rest, when such lower face of plate 19 contacts the surface 20, the center of the half-sphere terminating the rectilinear portion 13 is colinear with the line joining the summits of vees 8 and 9.

FIG. 6 shows how part 5 is initially placed between plate 19 and the surface 20. Plate 19 is brought against part 5 which brings the abutment 14 to the desired position. The center of the half-sphere and the point of contact with the end face are then at the proper height relative to the mounting base 1 and to the line joining the summits of the vees 8 and 9. The blocking screw 21 is then tightened in order to fix the position of abutment 14.

There remains nothing more than to place the part 5 on the vees 8, 9, to engage mechanism 2 and to start motor 11 so that the checking operation may begin. The operation is likewise effective with a part 5 of small diameter (FIG. 4). Part 5, shown on FIG. 4, being also shorter, the two vees 8 and 9 of FIG. 6 will be brought closer together. In order to do so the knurled head of the blocking screw 21 will be turned in the loosening sense which frees in translation the assembly made up by vee 8, abutment 14 and all of the calibration system (13, 13', 18, 19, 20, 21, 22) on the mounting base 1. Vee 9 remains in, place, being fixed relative to the mounting base 1.

In an analogous manner, the drive mechanism is also movable in translation relative to mounting base 1. A blocking screw 23, analogous to blocking screw 21 serves to hold it in position during the checking operation.

Figure 8:
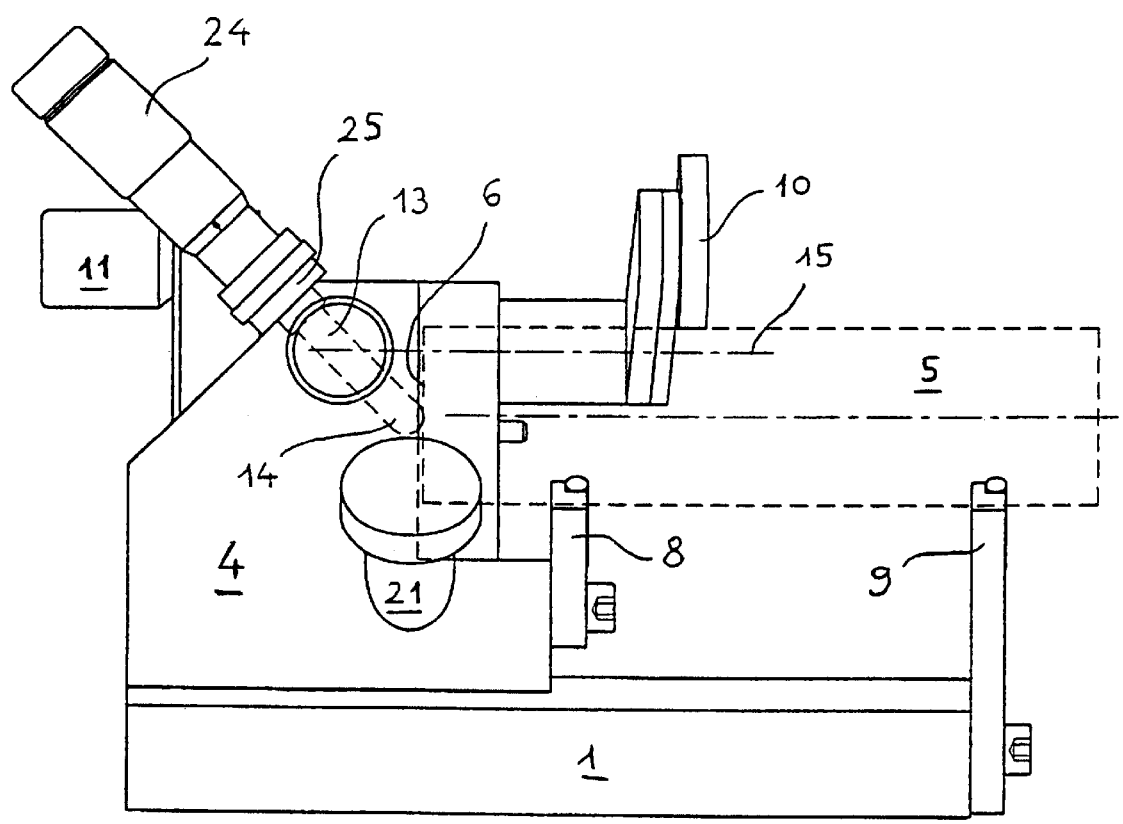
FIG. 8 is a front view of the apparatus of FIG. 7.

FIGS. 7 and 8 illustrate a second embodiment using a micrometer screw 24. The socket of such micrometer screw 24 is secured to the positioning arrangement 4 by a portion 25. The rectilinear portion 13 slides in the screw 24 as a function of the rotation of the knurled head of the screw 24. The center of the half-sphere constituting the abutment 14 extending the rectilinear portion 13 is aligned with the summits of the vees 8 and 9 when the micrometer display is set at zero. This corresponds to a fictional part of zero diameter.

Rotation of the knurled head of screw 24 causes retraction of the abutment 14, the rectilinear portion 13 penetrating into the socket of the screw 24. At all times the micrometer display indicates the diameter of the cylindrical portion of a part 5 which is to undergo checking by the apparatus.

This second embodiment enables the avoidance of manipulations of the part 5 prior to the checking thereof.

It is well understood that the invention is not limited to the examples as described; thus motor 11 can be replaced by a crank, the vees 8 and 9 can be replaced by rollers or exhibit an angle other than 90°, the adjustment of the height of the abutment can be effected by other means.

While a specific embodiment of the invention has been shown and described in detail to illustrate the application of the principles of the invention, it will be understood that the invention may be embodied otherwise without departing from such principles.

What is claimed is:

1. An apparatus for checking the shape of a part having a portion which is a cylinder of revolution around an axis and a reference end face, comprising:
   a base;
   a support arrangement mounted on said base for receiving said cylinder portion and comprising two V-shaped pieces;
   an arrangement for positioning said part axially with respect to said reference end face; and
   a mechanism for driving said part in rotation about said axis, wherein said positioning arrangement comprises:
      a rectilinear portion with an hemispheric end providing an abutment for said end face, slidingly mounted on said base along a direction which forms, with respect to said axis, an angle corresponding to the half of the angle of said V-shaped pieces, and
      means for adjusting the position of said rectilinear portion in a manner which maintains the abutment point of said hemispheric end with said end face on said axis.

2. The apparatus of claim 1, wherein said adjusting means comprises calibration means comprising a plate fixed to the rectilinear portion and forming a right angle with it, said plate and said rectilinear portion forming, together with a face of said base parallel to the plate, three abutment faces for said part.

3. The apparatus of claim 2, wherein said calibration means further comprises a leg fixed to said plate, parallel to the rectilinear portion and forming a fourth abutment face for said part.

4. The apparatus of any of claim 3, wherein the angle of said V-shaped pieces has a value of 90°.

5. The apparatus of any of claim 2, wherein the angle of said V-shaped pieces has a value of 90°.

6. The apparatus of claim 1, wherein said adjusting means comprises a micrometric screw acting on the other end of said rectilinear portion.

7. The apparatus of any of claim 6, wherein the angle of said V-shaped pieces has a value of 90°.

8. The apparatus of any of claim 1, wherein the angle of said V-shaped pieces has a value of 90°.

* * * * *